United States Patent

Kyuma

Patent Number: 5,111,452
Date of Patent: May 5, 1992

[54] LAN CONTROLLER

[75] Inventor: Yuriko Kyuma, Kawasaki, Japan

[73] Assignee: Kabushiki Kaisha Toshiba, Kawasaki, Japan

[21] Appl. No.: 592,313

[22] Filed: Oct. 3, 1990

[30] Foreign Application Priority Data

Oct. 6, 1989 [JP] Japan .................................. 1-261564

[51] Int. Cl.$^5$ .................................................. H04J 3/14
[52] U.S. Cl. .................................. 370/85.1; 340/825.5
[58] Field of Search ............... 370/85.1, 85.7, 85.13, 370/85.14, 94.1; 340/825.5, 825.05

[56] References Cited

U.S. PATENT DOCUMENTS 4,700,185 10/1987 Balph et al. .................... 370/85.13
4,831,620 5/1989 Conway et al. ................ 370/85.13
4,887,075 12/1989 Hirasawa .......................... 370/93

OTHER PUBLICATIONS

Echelon Presents "The LON TM System".

Primary Examiner—Douglas W. Olms
Assistant Examiner—Min Jung
Attorney, Agent, or Firm—Finnegan, Henderson, Farabow, Garrett and Dunner

[57] ABSTRACT

A LAN controller includes a memory device for storing data being received and transmitted by a microprocessor, data relating to data identification of said receiving and transmitting data, and data allowing/prohibiting the communication of said receiving and transmitting data, respectively, and a controller for automatically storing data allowing/prohibiting the communication of said receiving and transmitting data to said memory device when data relating to data identification of said receiving and transmitting data is stored into said memory device.

6 Claims, 4 Drawing Sheets

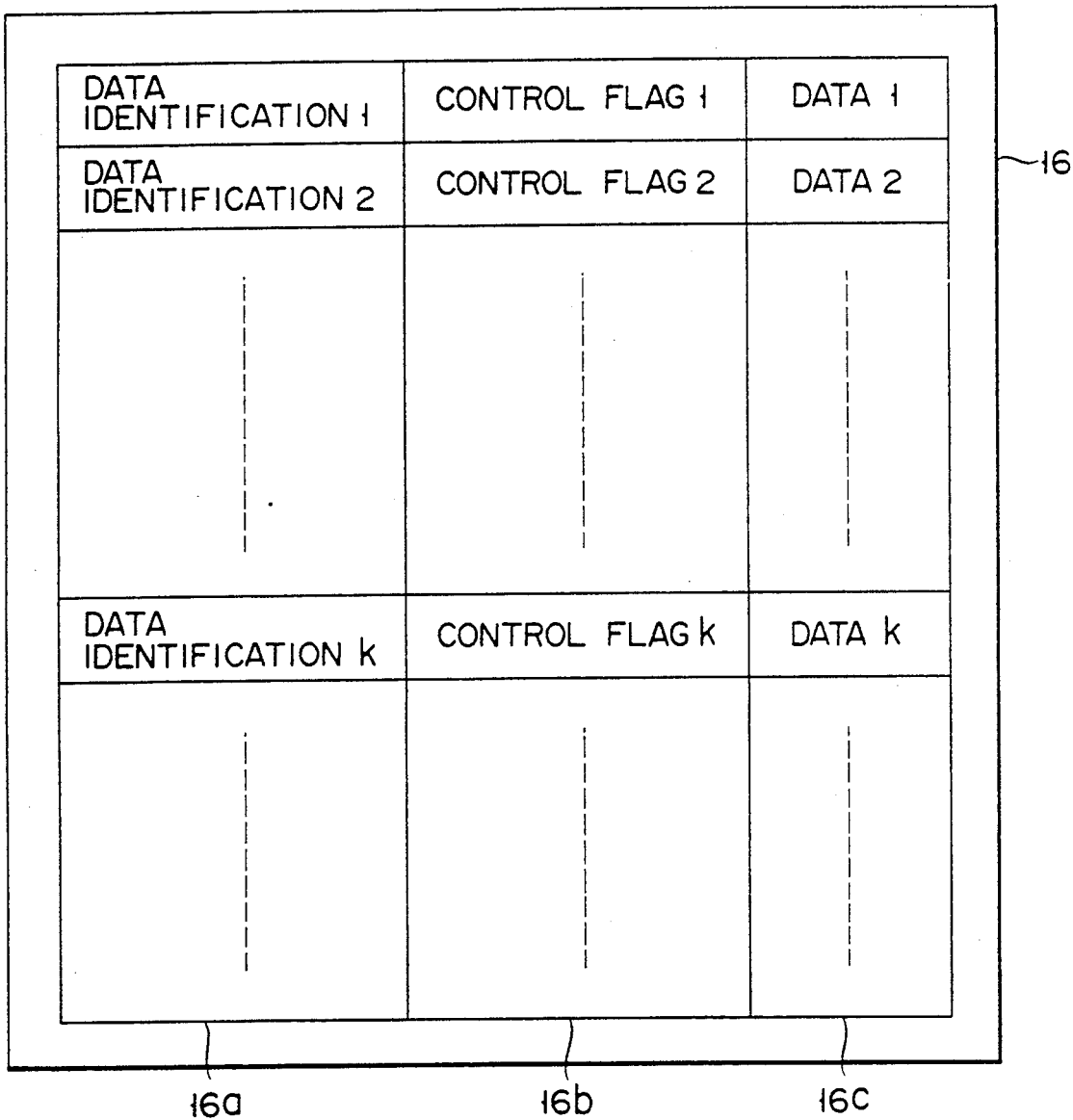
F I G. 2

1

LAN CONTROLLER

BACKGROUND OF THE INVENTION

1. Field of the Invention

The present invention relates to the improvement of a LAN (local area network) controller.

2. Description of the Related Art

In conventional Practice, LANs are constituted by the fact that one microprocessor is connected to a network via one LAN controller. Regarding the communication between the microprocessor and the network, data such as an identifier relating to data identification which is received/transmitted by the microprocessor, and data allowing the communication, are sequentially transmitted from the microprocessor to a LAN controller. Then, the communication between the microprocessor and the network were able to be performed after these data were stored into a memory device of the LAN controller.

However, to start the communication between the microprocessor and the network, it was necessary to store a necessary initialization, that is, data such as an identifier and data allowing data communication, into the memory device, so that the load on the microprocessor was increased.

Moreover, the conventional LAN controllers output data, which was input from the network, to the microprocessor as it was. In other words, identifiers such as a node address existing after or before data, a name of data, and bit for error check were added on the network. However, data itself was neither converted nor arithmetically operated on the network. In other words, data was converted and arithmetically operated only by the microprocessor, and the load on the microprocessor was further increased.

SUMMARY OF THE INVENTION

In order to solve the above-mentioned problem, the present invention has been made, and an object of the present invention is to provide, a LAN controller wherein the load on the microprocessor can be reduced when the communication between the microprocessor and the network is started.

To attain the above object, the LAN controller of the present invention comprises a memory device for storing data being received/transmitted by a microprocessor, data relating to data identification of said receiving/transmitting data, and data allowing/prohibiting the communication of said receiving/transmitting data, respectively; and a controller for automatically storing data allowing/prohibiting the communication of said receiving/transmitting data to said memory device when data relating to data identification of said receiving/transmitting data is stored into said memory device.

The LAN controller of the present invention comprises a microprocessor input/output device; a network input/output device; and an arithmetic unit which can convert or arithmetically operate data input from said microprocessor input/output device or said network input/output device.

The LAN controller of the present invention comprises a microprocessor input/output device; a network input/output device; and a controller which can convert or arithmetically operate data input from said microprocessor input/output device and said network input/output device and output said converted or arithmetically operated data into said network input/output device or said microprocessor input/output device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing a memory device of the LAN controller of FIG. 1;

DETAILED DESCRIPTION OF THE PREFERRED EMBODIMENTS

The embodiments of the present invention will be explained with reference to the drawings.

Figure 1:
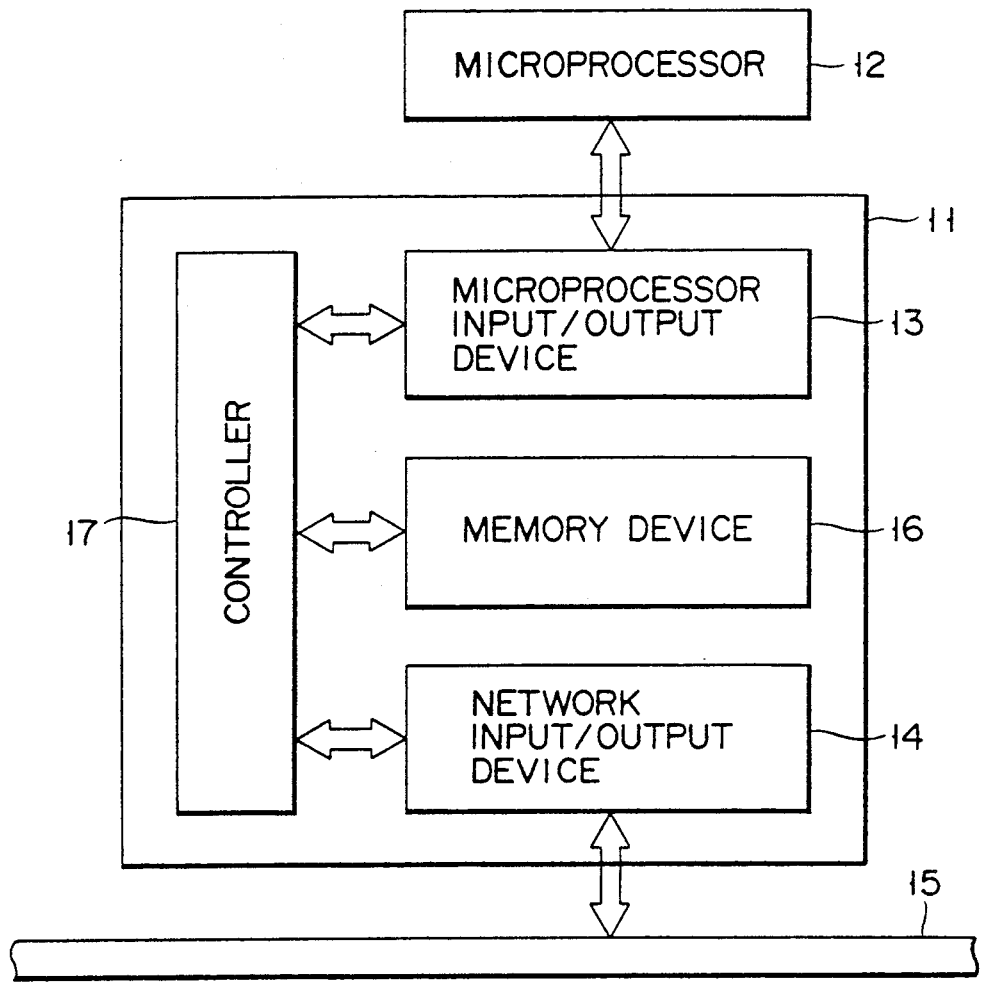
FIG. 1 is a block diagram showing a basic structure of a LAN controller relating to a first embodiment of the present invention.

FIG. 1 is a block diagram showing a basic structure of a LAN controller relating to a first embodiment of the present invention. FIG. 2 shows a memory device 16 of the LAN controller of FIG. 1. Reference numeral denotes a LAN controller; 12: a microprocessor; 13: a microprocessor input/output device; 14: a network input/output device; 15: a network; 16: a memory device; 16a: data identification area; 16b: a control flag area; 16c: a data area; and 17: a controller.

The LAN controller 11 of the present invention mainly comprises the microprocessor input/output device 13, the network input/output device 14, the memory device 16 and the controller 17. Data identification k (k=1, 2 ...) relating to data to be communicated, data relating to the data identification k, and data of control flag k (k=1, 2 ...) allowing/prohibiting data communication relating to the data identification k are respectively stored into the memory device 16.

Figure 3:
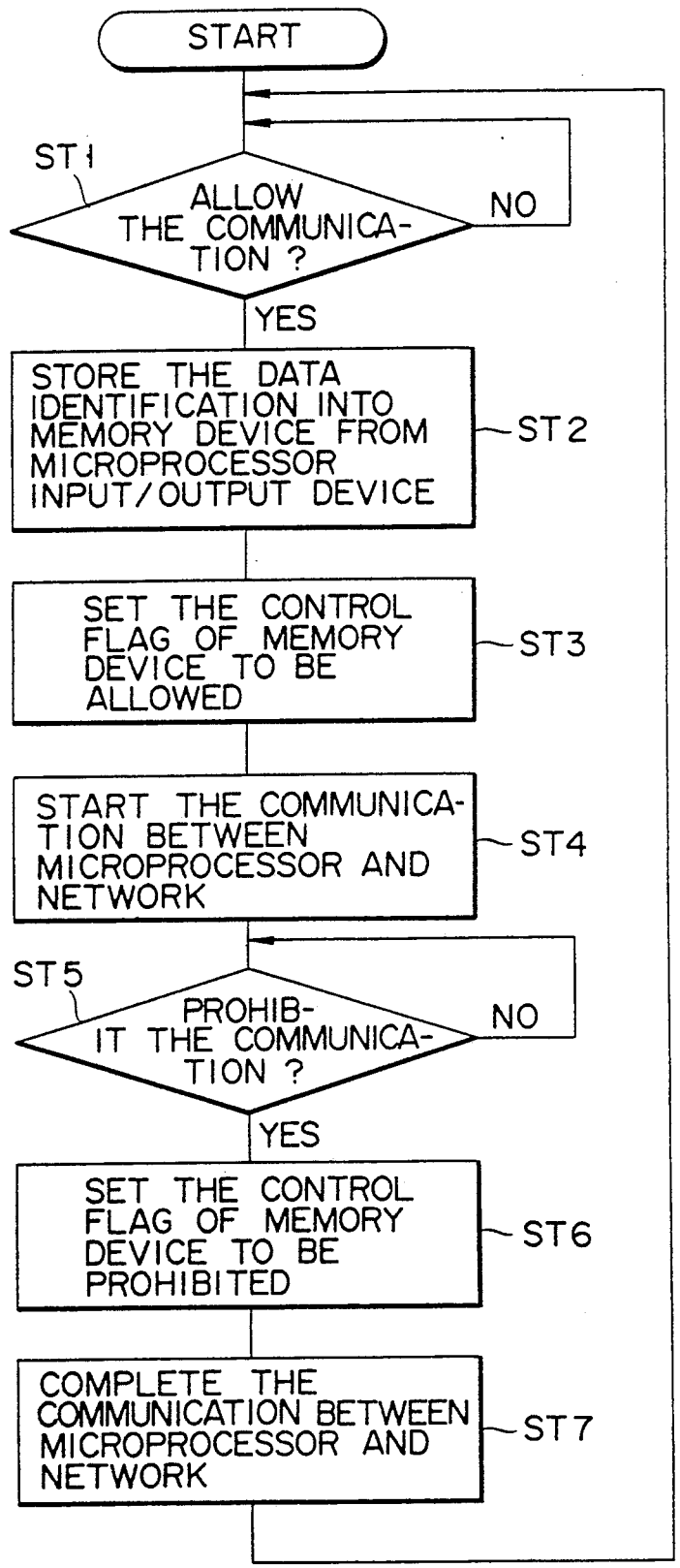
FIG. 3 is a flow chart showing a basic operation of the LAN controller relating to the first embodiment of the present invention.

The basic operation of the LAN controller of the present invention will be explained with reference to FIGS. 1, 2 and 3.

To start the communication between the microprocessor 12 and the network 15, data identification k (node address, name of data and the like) relating to data to be communicated is transmitted to the LAN controller 11 from the microprocessor 12. If data identification k is input to the microprocessor input/output device 13, the controller 17 controls to store data identification k into the memory device 16 (STEPs STs 1 to 2). After the controller 17 controls to store data identification k into the memory device 16, the controller 17 automatically sets control flag k allowing/prohibiting data communication relating to data identification k to be allowed (STEP ST3). For example, if data identification 1 is transmitted to the LAN controller 11 and stored into the memory device 16, control flag 1 is automatically set to be allowed. Thereby, data communication relating to data identification 1 is started (STEP ST4).

After the store of data identification k is completed, regarding data relating to the data identification k, the communication between the microprocessor 12 and the network 15 is sequentially performed. On the other hand, regarding the data identification k, to complete the communication between the microprocessor 12 and the network 15, data relating to the data identification k and data to prohibit the communication between the microprocessor and the network may be sequentially transmitted to the LAN controller from the microprocessor 12. In other words, if these data are input into the microprocessor input/output device 13, the controller 17 sets control flag k relating to the data identification k to be prohibited (STEPs STs 5 to 6), similar to the conventional case. Thereby, data regarding data identification k, the communication between the microprocessor 11 and the network 15 is completed (STEP ST7).

As mentioned above, if data identification k relating to data to be transmitted/received is input into the microprocessor input/output device 13, the controller 17 stores the data identification k into the memory device 16 and automatically sets control flag k allowing/prohibiting data communication relating to data identification k to be allowed. Due to this, when the communication between the microprocessor and the network the data communication from the microprocessor 12 to the LAN controller 11. Thereby, the initialization is softened and the load on the microprocessor 12 is largely reduced when the communication between the microprocessor 12 and the network 15 is started.

Moreover, since control flag k allowing/prohibiting the data communication relating to data identification k is stored in the memory device 16, data allowing the data communication, which was conventionally necessary, that is, one bit used for control flag k can be employed as other control data. In this case, other data means data of data identification k. For example, assuming that data is increased by one bit, data of data identification k will be doubled.

Figure 4:
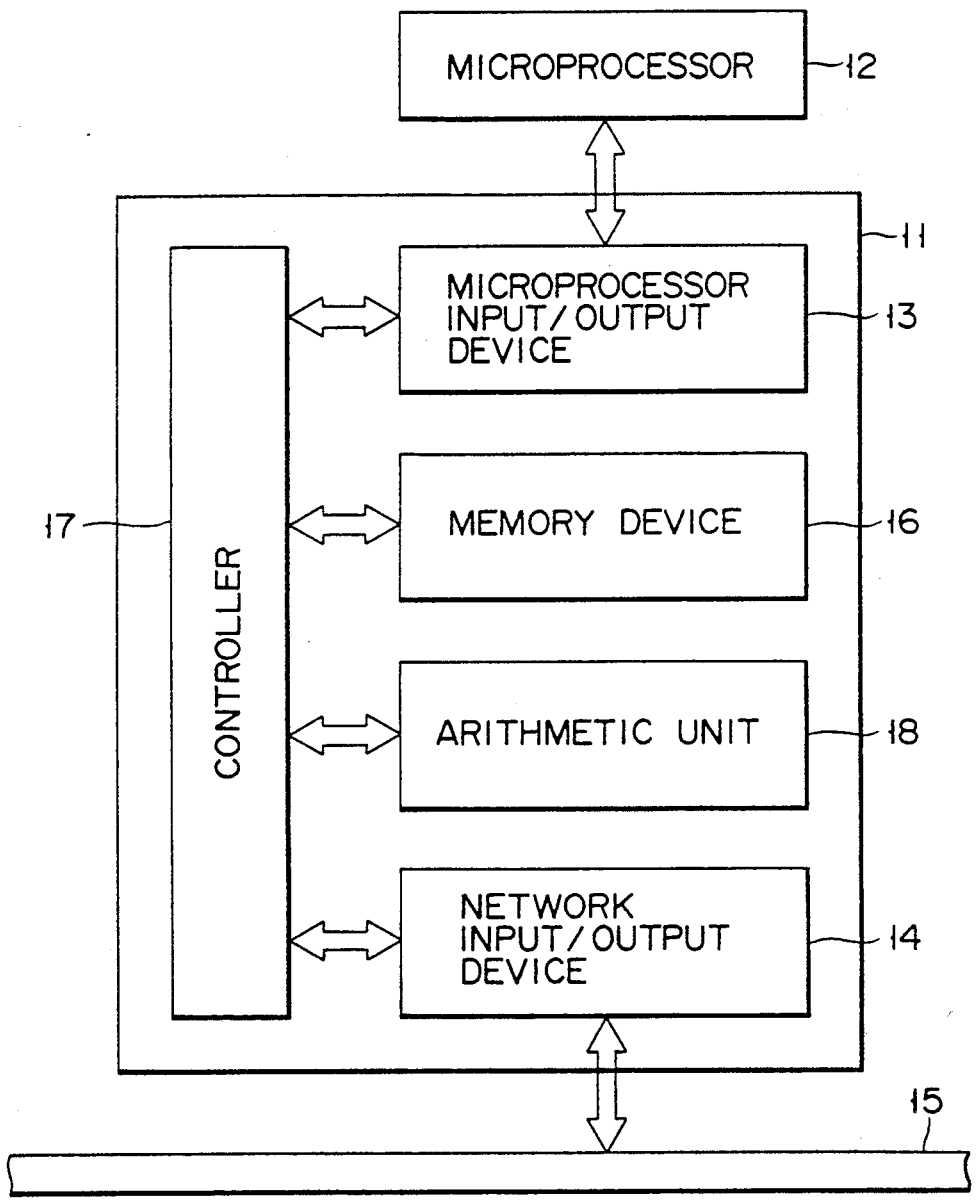
FIG. 4 is a block diagram showing a basic structure of the LAN controller relating to a second embodiment of the present invention.

FIG. 4 is a basic structure of a LAN controller relating to the second embodiment of the present invention. Reference numeral 11 is a LAN controller; 12: a microprocessor; 13: a microprocessor input/output device; 14: a network input/output device; 15: a network; 16: a memory device; 17: a controller; and 18: an arithmetic unit.

In conventional, data conversion and/or calculation were performed only by the microprocessor 12. In other words, the LAN controller 11 generated input data as it was.

In the LAN controller of the second embodiment, a arithmetic unit 18 is further provided in the LAN controller 11 of the first embodiment. That is, a calculation function is provided in the LAN controller 11 and data conversion and calculation can be performed in the LAN controller 11.

More specifically, data, which is input to the microprocessor input/output device 13 or the network input/output device 14, is transferred to the arithmetic unit 18 by the controller 17 as required. The arithmetic unit 18 comprises such as a high-speed multiplier, a high-speed divider, a floating point processor, and the like. Thereby, data having a different value from input data value is output to the network input/output device 14 or the microprocessor input/output device 13. Additionally, after a plurality of input data are calculated, the calculated result can be output from the microprocessor input/output device 13 or the network input/output device 14. Moreover, input data can be directly output without being converted and/or calculated.

Additionally, data input designation and data output designation can be arbitrarily selected. Moreover, the calculation is performed by the controller 17 itself without providing the arithmetic unit 18, thereby making it possible to provide the calculation function to the LAN controller 11.

As mentioned above, since the calculation to be performed by the microprocessor 12 can be executed by the LAN controller 11, the load on the microprocessor 12 can be reduced. Also, if the calculation function, which the microprocessor 12 does not have, is provided in the arithmetic unit 18 of the LAN controller 11, the arithmetic unit 18 can be operated more effectively.

Additional advantages and modifications will readily occur to those skilled in the art. Therefore, the invention in its broader aspects is not limited to the specific details, and representative devices, shown and described herein Accordingly, various modifications may be made without departing from the spirit or scope of the general inventive concept as defined by the appended claims and their equivalents.

What is claimed is:

1. A LAN controller, comprising:
    a memory device for storing first data being received and transmitted by a microprocessor, second data relating to data identification of said first data, and third data allowing/prohibiting the communication of said first data, respectively; and
    a controller for causing said memory device to automatically store third data allowing/prohibiting the communication of said first data only when said second data is stored into said memory device.

2. A LAN controller according to claim 1, wherein said data relating to identification of said first data is a node address or a name of data.

3. A LAN controller according to claim 1, further comprising:
    a microprocessor input/output device;
    a network input/output device; and
    an arithmetic unit which can convert or arithmetically operate data input from said microprocessor input/output device or said network input/output device.

4. A LAN controller according to claim 3, wherein said arithmetic unit comprises a high-speed multiplier.

5. A LAN controller according to claim 3, wherein said arithmetic unit comprises a divider.

6. A LAN controller according to claim 3, wherein said arithmetic unit comprises a floating point processor.